United States Patent
Cohen et al.

(10) Patent No.: US 7,548,338 B2
(45) Date of Patent: Jun. 16, 2009

(54) APPARATUS AND METHOD FOR PROCESSING VARIABLE PRINT DOCUMENTS

(75) Inventors: Amit Cohen, Ramat Gan (IL); Yaniv Israeli, Natanya (IL); Israel Roth, Ra'-anana (IL)

(73) Assignee: XMPie (Israel) Ltd., Netanya (IL)

( * ) Notice: Subject to any disclaimer, the term of this patent is extended or adjusted under 35 U.S.C. 154(b) by 853 days.

(21) Appl. No.: 10/525,962

(22) PCT Filed: Aug. 28, 2003

(86) PCT No.: PCT/IL03/00708

§ 371 (c)(1),
(2), (4) Date: Feb. 28, 2005

(87) PCT Pub. No.: WO2004/021101

PCT Pub. Date: Mar. 11, 2004

(65) Prior Publication Data

US 2006/0044614 A1 Mar. 2, 2006

Related U.S. Application Data

(60) Provisional application No. 60/406,333, filed on Aug. 28, 2002.

(51) Int. Cl.
*G06K 15/00* (2006.01)
*G06F 3/12* (2006.01)
*G06F 15/00* (2006.01)
*G06K 1/00* (2006.01)

(52) U.S. Cl. ........................... 358/1.18; 358/1.1
(58) Field of Classification Search ................ 358/1.18, 358/1.1; 345/530
See application file for complete search history.

(56) References Cited

U.S. PATENT DOCUMENTS

| | | | |
|---|---|---|---|
| 5,655,130 A | | 8/1997 | Dodge et al. |
| 5,937,153 A | | 8/1999 | Gauthier |
| 6,008,812 A | * | 12/1999 | Ueda et al. .................. 345/418 |
| 6,052,486 A | * | 4/2000 | Knowlton et al. ........... 382/232 |
| 6,088,708 A | * | 7/2000 | Burch et al. ................. 715/229 |
| 6,209,010 B1 | | 3/2001 | Gauthier et al. |
| 6,381,028 B1 | | 4/2002 | Gauthier |
| 6,470,156 B1 | | 10/2002 | Sahay |
| 6,476,931 B1 | * | 11/2002 | Aizikowitz et al. ........ 358/1.18 |
| 6,487,568 B1 | | 11/2002 | Gauthier et al. |
| 6,599,325 B2 | | 7/2003 | Gauthier et al. |
| 6,687,016 B2 | | 2/2004 | Gauthier |

(Continued)

OTHER PUBLICATIONS

International Search Report for PCT/IL03/00708 dated Nov. 24, 2004.

*Primary Examiner*—Mark K Zimmerman
*Assistant Examiner*—Fan Zhang
(74) *Attorney, Agent, or Firm*—Pearl Cohen Zedek Latzer, LLP (57) ABSTRACT

Processing of a variable print document corresponding to a plurality of elements, each element having a type, a coverage area and a z-axis value, may be improved by creating a composite elements to replace groups of elements when element types are compatible and when creating composite elements is desirable based at least on the coverage area of the composite element, for example, in relation to the sum of the coverage areas of the elements in the group, and otherwise swapping z-axis values of elements if the elements do not overlap.

18 Claims, 7 Drawing Sheets

U.S. PATENT DOCUMENTS

| | | |
|---|---|---|
| 6,763,500 B2 | 7/2004 | Black et al. |
| 6,771,387 B2 | 8/2004 | Gauthier |
| 6,919,967 B1 * | 7/2005 | Pentecost et al. ............ 358/1.15 |
| 7,110,137 B2 * | 9/2006 | Burgess et al. .............. 358/1.18 |
| 2003/0050934 A1 | 3/2003 | Gauthier et al. |
| 2003/0095135 A1 * | 5/2003 | Kaasila et al. .............. 345/613 |
| 2004/0130752 A1 | 7/2004 | Gauthier |
| 2004/0141197 A1 | 7/2004 | Gauthier |

* cited by examiner

|   | 1 | 2 | 3 | 4 | 5 | 6 |
|---|---|---|---|---|---|---|
| 1 | ✕ | 0 | 1 | 1 | 1 | 0 |
| 2 | 0 | ✕ | 0 | 1 | 0 | 1 |
| 3 | 1 | 0 | ✕ | 0 | 0 | 0 |
| 4 | 1 | 1 | 0 | ✕ | 0 | 1 |
| 5 | 1 | 0 | 0 | 0 | ✕ | 0 |
| 6 | 0 | 1 | 0 | 1 | 0 | ✕ |

|  | 2 | 1U3 | 4 | 5 | 6 |
|---|---|---|---|---|---|
| 2 | × | 0 | 1 | 0 | 1 |
| 1U3 | 0 | × | 1 | 1 | 0 |
| 4 | 1 | 1 | × | 0 | 1 |
| 5 | 0 | 1 | 0 | × | 0 |
| 6 | 1 | 0 | 1 | 0 | × |

Fig. 5

|   | 2 | 1U3U5 | 4 | 6 |
|---|---|---|---|---|
| 2 | ✕ | 0 | 1 | 1 |
| 1U3U5 | 0 | ✕ | 1 | 0 |
| 4 | 1 | 1 | ✕ | 1 |
| 6 | 1 | 0 | 1 | ✕ |

Fig. 6

|   | 2 | 1U3U5 | 4U6 |
|---|---|---|---|
| 2 | ✕ | 0 | 1 |
| 1U3U5 | 0 | ✕ | 1 |
| 4U6 | 1 | 1 | ✕ |

APPARATUS AND METHOD FOR PROCESSING VARIABLE PRINT DOCUMENTS

CROSS-REFERENCE TO RELATED APPLICATIONS

This application is a National Phase Application of PCT International Application No. PCT/IL2003/000708, International Filing Date Aug. 28, 2003, claiming priority of U.S. Provisional Patent Application, 60/406,333, filed Aug. 28, 2002.

BACKGROUND OF THE INVENTION

In variable print technologies, document sets are produced in which each document in the set is targeted or personalized to a different recipient, but all documents of the set may share some elements. Elements in the document may be categorized into three types, namely, fixed, reusable and unique. Fixed elements are used by each and every document in the set. Reusable elements are used by at least two but not all documents in the set. Unique elements are used only by one document in the set. The sharing of fixed or reusable elements may improve the efficiency of processing variable print documents because shared elements may be described, processed, and cached collectively in one action, thereby to reduce memory- and time-consuming redundancy.

Creation of variable print documents using state of the art authoring systems may rely on the use of a page layout tool and a method of specifying the logic of each document in the set. The logic may dictate the selection of reusable elements based on certain data in a database and certain business rules. The logic may also specify how to generate the unique elements, for example, a text element may contain a unique address of a recipient.

The output of such authoring tools is a print stream in a standard format describing the pages to be printed. The commonly used formats for printing such jobs efficiently describes the documents in the set in terms of the elements that make up the document. This improves the efficiency of the description in terms of file size as well as providing the necessary information for the printing system to perform further optimizations and caching. Examples of commonly used print stream formats that employ the methodology of describing documents in terms of reusable elements include Creo's proprietary Variable Print Specifications (VPS) format, Personalized Print Markup Language (PPML), for example, as defined by the Print On Demand Initiative, and Personalized Print Markup Language/Variable Data Exchange (PPML/VDX), developed by the Committee for Graphic Arts Technologies Standards (CGATS), and it was approved by the American National Standards Institute (ANSI) in 2002 and available from the Association for Suppliers of Printing, Publishing and Converting Technologies (NEPS).

The operation of authoring tools may be defined by the page layout space and the print stream space.

The page layout space describes the intended appearance of a page in terms of page elements, which may be created by a graphic designer using page layout tools such as, for example, Quark Xpress or Adobe InDesign. These page layout tools allow the designer to place, e.g., on a computer screen, a representation of the final page, rectangular frames, text boxes, raster images, and other shapes. The page layout application may be augmented by a dynamic document authoring tool that allows insertion of data or logic driven elements into the design space. For example, a name or address may be inserted to a text paragraph, or an image of a product may be dynamically inserted to an image box. The authoring tool may maintain the information on the nature of reuse of each element (for example, whether it is fixed, reusable or unique). The print stream space may describe the print job in terms of a set of elements (e.g., fixed, reusable or unique) and a set of page descriptions that make references to these elements.

In order for an authoring tool to produce its output, it is desirable to map the elements from the page layout space to elements in the print stream space and generate the page descriptions in terms of references. A basic mapping scheme may dictate that:

(a) For each fixed element in the print layout space, generate one corresponding fixed element in the print stream space.

(b) For each reusable element in the print layout space, there may be k different reusable elements in the print stream space, k being the number of different instances.

(c) For each unique element in the print layout space, there will be n different unique elements in the print stream space, n being the number of recipients, or number of instance documents in the set.

The authoring tool may use the basic mapping scheme to map most elements from the page layout space description of the document to the print stream. However, with an increased number of elements, the amount of processing may increase significantly. Moreover, with an increased number of overlapping elements, there is an increased amount of redundant or unnecessary processing because processing speed may be proportional to the total coverage area of all the elements in the document. Thus, using current techniques, a variable print document may often exceed the cache for the raster image processor (RIP) associated with the output device, e.g., the printer. A method and apparatus are therefore desirable for efficient processing of data in the production of variable print documents.

SUMMARY OF EMBODIMENTS OF THE INVENTION

A method in accordance with embodiments of the present invention allows for processing of a variable print document corresponding to a plurality of elements, each element having a type, a coverage area and a z-axis value, by creating a composite elements to replace groups of elements when element types are compatible and when creating composite elements is desirable based at least on the coverage area of the composite element, for example, in relation to the sum of the coverage areas of the elements in the group, and otherwise swapping z-axis values of elements if the elements do not overlap. A method in accordance with embodiments of the present invention may allow for reducing the total coverage area of a document, as well as reducing the total number of elements in the documents, without visibly altering the original visual layout of the document. Because creating composite elements to replace a plurality of elements may result in an increase in total coverage area, the method may ensure that a maximum total coverage area is not exceeded, for example, by setting a threshold maximum total coverage area.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1A:
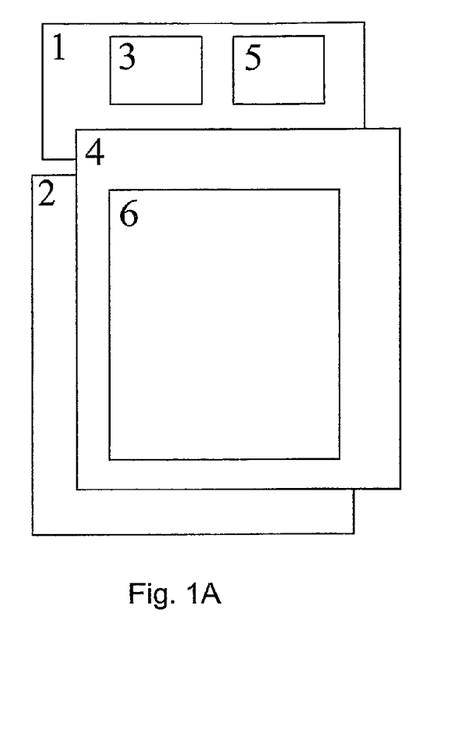
FIGS. 1A and 1B are conceptual top and oblique views of an illustration of a layout of a variable print document having fixed, reusable and unique elements in accordance with embodiments of the present invention.
Figure 1B:
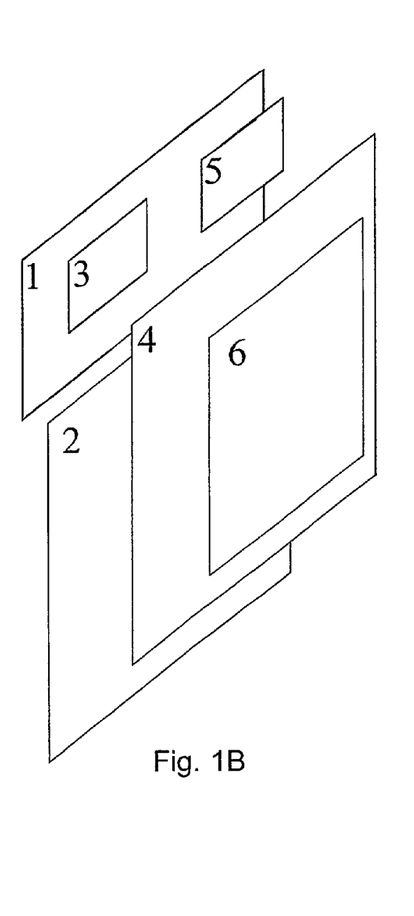

A method in accordance with an exemplary embodiment of the present invention may assume a description of a document in terms of its pages where each page may be formed of a set of page elements. Page elements may be, for example, text boxes, image boxes or objects of any other format or geometric shape. For purposes of illustration, reference is made to FIGS. 1A and 1B, which are conceptual illustrations of top and oblique views of a page layout space. The page layout space describes the intended appearance of a page in terms of page elements, which may be created by a graphic designer using a desktop tool such as Quark Xpress or Adobe InDesign. The page layout tools allow the designer to place, e.g., on a computer screen representation of the final page, rectangular frames, text boxes, raster images, and other shapes. The page layout application may be augmented by a dynamic document authoring tool that allows insertion of data or logic driven elements into the design space. The authoring tool may maintain information on the nature of reuse of each element, for example, whether it is fixed, reusable or unique. The example page layout shown in FIGS. 1A and 1B contains design elements 1, 2, 3, 4, 5 and 6. These elements are described further below. In exemplary embodiments of the invention, for each such page element, at least the following information may be provided, recorded or obtained. It will be noted that in other embodiments of the invention, other structures for describing the page layout and its component elements may be used:

(a) Element Geometry. The geometry of an element may include, for example, the shape and location of the element. Among the characteristics of the geometry of an element may, for example, be its bounding box, a rectangular, polygonal or other area enclosing the element. Such bounding boxes are indicated in FIGS. 1A and 1B by rectangles 1 through 6. It will be understood that the elements represented in the conceptual illustration of FIGS. 1A and 1B need not be rectangular or even polygonal. In some embodiments of the invention, a rectangular or other polygonal enclosing space may be used as an approximation for the coverage area of the element; however, it will be recognized that no approximation or model need be used in connection with certain embodiments of the present invention, and in embodiments using such approximations or models, any suitable shape may be used. For purposes of the example of FIGS. 1A and 1B, the following coverage areas of the respective bounding boxes are assumed: Element 1 has area 21 units; Element 2 has area 56 units; Element 3 has area 3 units; Element 4 has area 56 units; Element 5 has area 3 units; Element 6 has area 30 units. Thus, without any optimization, the initial total coverage area of the elements on the page is 169 units, and the total number of elements is six (6). It will be noted that in some embodiments of the invention, bounding boxes are not used, but that information about the element, such as coverage area or location in the layout, may be obtained directly from the geometry of the element, and not through a bounding box approximation.

(b) z-order of element. In a description of page layout elements according to exemplary embodiments of the invention, z-order may denote the layering order of elements on the page. Each element may have an ordinal integer z-order value. Typically, for example, no two elements may have identical z-order number, and a portion of an element with a higher z-order may obscure a portion of an element with a lower z-order where the elements or their respective bounding boxes overlap. In the example illustrated in FIGS. 1A and 1B, the number used for each element indicates its location in the z-axis. Thus, element 1 is the bottom-most element, and all elements placed in higher z-axis order that overlap with element 1, for example, element 4, obscure those portions of element 1. Likewise, for example, element 6 obscures elements 2 and 4. It will be noted that if two elements or their respective bounding boxes do not intersect, such as, for example, elements 3 and 5, their respective z-order has no significance in the final appearance of the page with respect to each other, and as explained further below, in some circumstances, it may be advantageous to swap the z-axis order of the elements. It will be recognized that other methods may be used to describe the layering of elements in the page layout consistent with embodiments of the present invention.

(c) Element classification or type. In an exemplary embodiment described herein, type may be, for example, one of Unique, Reusable or Fixed. For purposes of the example provided in FIGS. 1A and 1B, it will be assumed that elements 1, 3, and 5 are fixed, each respectively have one instance, or one content. In contrast, unique elements 2, 4, and 6 may have as many different instances as there are documents in the set. It will be recognized that other suitable types may be defined and used in connection with other embodiments of the invention.

As discussed above, processing efficiency may partially be a function of total coverage area. Thus, if the total coverage area were to be reduced, processing time may be improved. This first goal may be accomplished, for example, by uniting elements that overlap at least partially. In exemplary embodiments of the invention, uniting elements may mean creating a single element having a shape identical to the composite shapes of the two elements. If the elements had at least partial overlap, the area of the new composite element including the two original elements may be less than the sum of the two coverage areas of the original elements. Thus, in some instances, coverage area may be reduced by uniting at least partially overlapping elements.

In addition, processing efficiency may also partially be a function of, for example, the total number of elements in the document, for example, due to overhead processing time costs for each element. Thus, reducing the total number of elements in a document may also improve processing. This second goal, like the first goal, may also be accomplished by uniting elements. It will be noted, however, that with regard to some elements, reducing the total number of elements may have the effect of increasing total coverage area, particularly, where there is no overlap between the elements. Thus, there may be a conflict between the goals of reducing total coverage area of the elements and reducing the total number of elements.

It will be noted that according to embodiments of the present invention, in uniting elements, the design intent is typically not altered. That is, the intent of the designer of the document with regard to which elements overlap which other elements is generally preserved.

It will be further noted that in some cases, even where uniting elements may serve one of the first and second goals stated above, and where uniting the elements would not interfere with the design intent, for example, where there is no overlap between the elements, the types of elements may not permit them to be united. According to some embodiments of the present invention, elements may only be united that share a type. Thus, where appropriate, a fixed element may be united with a fixed element. That is, a new composite fixed element may be created to replicate the effect of the two original fixed elements. Similarly, a unique element may be united with a unique element. These types may be compatible for uniting because two unique elements, for example, a first name and a last name, will always appear in conjunction with each other. In contrast, reusable elements typically may not be united because each may refer to different criteria, and have a different number of instances in the document set. It will be appreciated that the above description of exemplary embodiments is not intended to limit the scope of the present invention, and that in some embodiments of the invention, types may be defined differently, and the conditions for uniting elements may be different from those herein described.

According to an exemplary embodiment of the invention, at a pre-processing stage, certain procedures may be performed to facilitate the ensuing stages. In one pre-processing step, if such data is not already present, a z-axis value may be associated with each element of an input document, and the elements may be ordered accordingly.

In another pre-processing step, a matrix containing the intersection information with respect to the initial elements contained in the document may be calculated. An intersection matrix may be built as part of the initial phase of the algorithm as described herein to allow for simple testing of intersection of two elements to determine whether they may be combined. To build the matrix, all elements may be considered for intersection with all other elements. Exemplary embodiments of the invention may use a bounding box as an approximation for the coverage area of an element as described above, or the actual shapes of the elements, such as in the form of bitmap masks. A matrix may be created according to an exemplary embodiment of the invention to record the intersection or non-intersection of each element with the other elements. Thus, for example, if the bounding box of element i is compared against the bounding box of element j and found to overlap, the appropriate matrix entry (i,j) may be marked as "1"; otherwise it may be marked as "0". Other processing sets may be used in conjunction with embodiments of the present invention and the processing set herein described need not be used.

Figure 2:
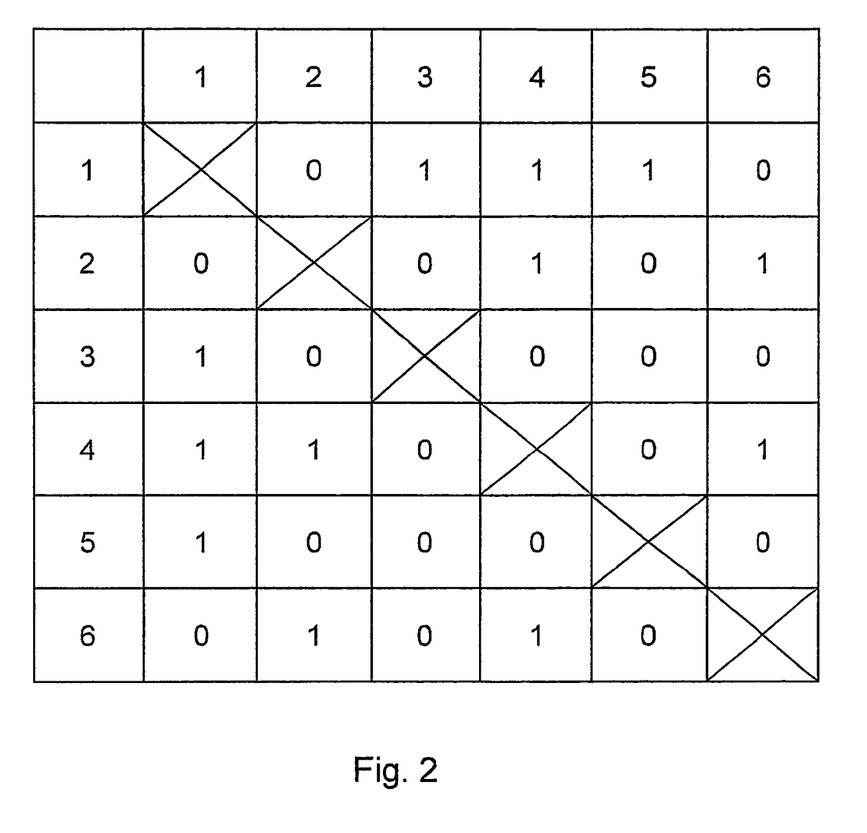
FIG. 2 is a schematic diagram of an intersection matrix corresponding to the layout of FIGS. 1A and 1B, in accordance with embodiments of the present invention.

FIG. 2 is an illustration of an initial intersection matrix that may be used in connection with the variable document configuration of FIGS. 1A and 1B. Because element 1 intersects with elements 3, 4 and 5, a "1" is inserted into the appropriate locations in the matrix. During the course of the later phases of the algorithm, this matrix may be referred to in order to determine whether certain elements may or may not be swapped in the z-axis order. Two elements whose intersection value in the overlap matrix is "0" may be swapped. Two elements whose intersection value in the overlap matrix is "1" may not be swapped, because doing so would alter the visual appearance of the document. Each time two elements are joined, their corresponding intersection matrix entries may be joined by joining the appropriate two rows and two columns of the matrix. The intersection matrix values for the new compound element may be set to be "1" if either of the two original elements intersects an element. The intersection matrix values for the new compound element may be set to be "0" if neither of the two original elements intersects an element. It will be recognized that other pre-processing methods for determining intersection of elements may be used in conjunction with embodiments of the present invention, or the determination may not be made during pre-processing, but rather during processing of elements in accordance with a method in accordance with embodiments of the invention.

Figure 3:
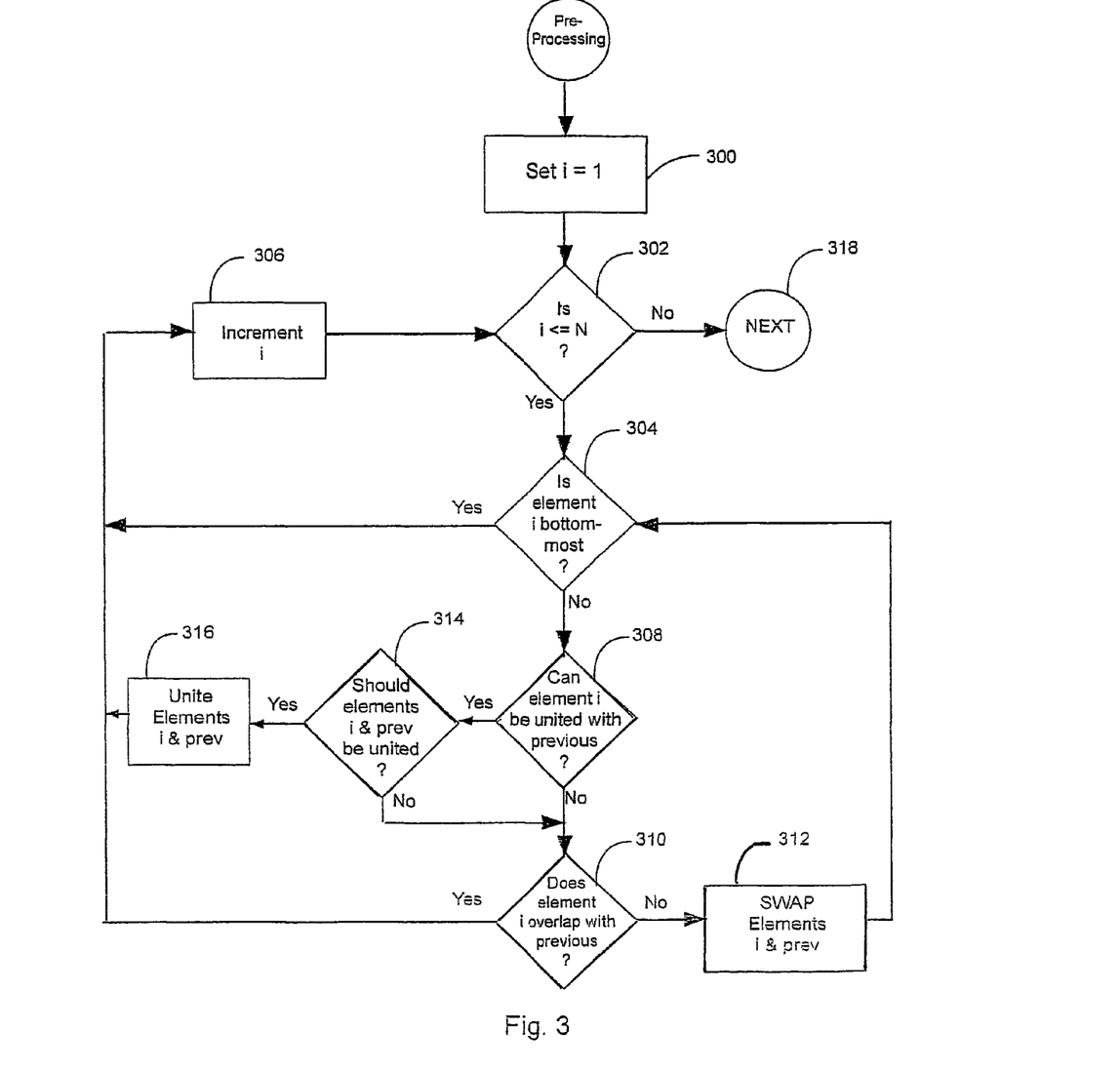
FIG. 3 is a schematic diagram of a flowchart for a method in accordance with embodiments of the present invention.

Using the layout of FIGS. 1A and 1B as an example, the intersection matrix illustrated in FIG. 3 may be constructed. Thus, for example, because element 1 overlaps with elements 3, 4 and 5, a "1" is inserted into the matrix at the crossing of element 1 and each of elements 3, 4, and 5. Likewise, because element 1 does not overlap with elements 2 and 6, a "0" is inserted into the matrix at the crossing of element 1 and each of elements 2 and 6.

It will be evident to those of sill in the art that the above pre-processing steps may or may not be included in embodiments of the invention. If they are so included, there are many variations of algorithms and structures that may accomplish similar goals within the scope of the present invention. In addition, it will be noted that in some embodiments, further accuracy of the overlap matrix may be obtained by using a polygonal or other non-rectangular enclosing path that better describe the elements for irregular shapes, or for example, performing a bit-map comparison of the actual shapes to determine whether they overlap.

A method in accordance with the present invention may operate to reduce the total coverage area of elements in the document, as well as the total number of elements in the document by uniting elements. According to an exemplary embodiment of the invention, pairs of elements are processed to determine whether uniting them, that is, creating a composite element to replace the two elements, is desirable. If not, the method may determine whether they may be changed in the z-axis order in order to permit possible uniting with another element. FIG. 3 is a schematic illustration of a flowchart of a method in accordance with an exemplary embodiment of the present invention. The following discussion represents a discussion of the exemplary embodiment presented as well as a simplified depiction of how an embodiment of the invention may be applied to the document depicted in FIGS. 1A and 1B. As noted above, the intersection matrix may be created as illustrated in FIG. 2.

At block 300, the parameter i is set to the number 1, representing that the elements are to be considered starting with the element lowest in the z-axis order. At block 302, the method determines whether elements remain to be analyzed. If so, the method may loop through the flowchart another time for element i, starting with block 304; if not, and all elements have been analyzed, the method may proceed to another stage, at block 318. This ensures that the loop ends when i exceeds the maximum value of N, the number of elements in the z-axis. Thus, $ELM_i$, referring to Element i, which in the first iteration according to this example, is Element 1, is first considered.

At block 304, the method determines whether Element i cannot be "pushed down" in the z-axis order, that is, whether it is not at the bottom of the layout. If the element is at the bottom, i may be incremented at block 306, and the next element may be processed; if the element is not at the bottom of the layout, the method may proceed to block 308. In the example given, because Element 1 is the lowest in the z-axis order, i is incremented at block 306.

The process then repeats for i=2. Next, Element 2 is considered. At block 304, it is determined that Element 2 is not at the bottom of the z-axis order. Next, at block 308, the method may determine whether Element i may be united with the element previous to it, or directly lower than it, in the z-axis. In order to determine whether two element types are compatible for being united, in this exemplary embodiment they must both be fixed or both be unique. According to one embodiment of the invention, a unification matrix may be created to contain the unification compatibility of each pair of elements. According to an embodiment of the present invention, in order to determine whether it is possible to unify two elements, the intersection matrix may be consulted to determine whether the two elements are non-overlapping. For example, two unique elements may be unified with each other, and two fixed elements may be unified with each other. It will be appreciated that other embodiments of the invention may use a different analysis to determine whether elements may be united. If the elements may be united, the method proceeds to block 314 to determine whether uniting the elements is desirable; if they may not be united, at block 310 the method determines whether the elements overlap. In the example provided, because Element 1 is fixed and Element 2 is unique, the elements are of incompatible type, and they cannot be united.

Next, at block 310, it is determined whether element i and the previous element in the z-axis order overlap. If so, as shown at block 306, the method proceeds to analyze the next element; if not, as shown at block 312, the z-axis of the elements are swapped. In the example provided, Element 2 and Element 1 overlap. According to the intersection matrix of FIG. 2, a "0" appears at the crossing of Elements 1 and 2, indicating that there is no overlap between them. Thus, the method may proceed to block 312, where the z-axis order of Elements 1 and 2 may be swapped. According to an exemplary embodiment of the invention, swapping two elements indicates involves interchanging their order in the z-axis. In the example given, Element 2 is re-assigned a z-axis order of 1, and Element 1 is re-assigned a z-axis order of 2. Upon swapping elements, according to an exemplary embodiment of the invention, the rows and columns of the intersection matrix representing the elements being swapped may also be swapped. Thus, after swapping Elements 1 and 2, the column containing the intersection information for Element 1 is swapped with the column containing the intersection information for Element 2. Likewise, the rows for the two elements may be swapped. Thus, the order of elements along the z-axis is now 2-1-3-4-5-6. The above is a description of how swapping elements may be accomplished in accordance with the embodiment presented herein. It will be recognized that swapping elements may be accomplished in numerous ways, depending, for example, on the structure used to describe elements in the layout. Subsequently, at block 304, the method again determines whether the element analyzed is at the bottom of the z-axis. In the example provided, Element 2, which has z-axis order 1, is determined to be the bottom-most element in the z-axis order. Thus, i is incremented to 3 at block 306.

The analysis loop starting with block 304 may be repeated for each element. In the example provided, at block 304, Element 3 is not bottom-most. At block 308, the method determines whether Element 3 may be united with the element directly below it, which is Element 1. In the example provided according to an exemplary embodiment of the invention, the two elements may be united because they both have fixed type. Next, at block 314, the method may determine whether uniting the elements is desirable. While there are numerous ways to determine whether uniting the elements is desirable, in the embodiment of the invention herein described, this is done by determining whether uniting the elements would result in reduction of the total coverage area. The determination of whether uniting elements would result in a reduction of total coverage area of the document may be accomplished in various ways. According to an exemplary embodiment of the invention, this determination may be made by comparing the coverage area of a composite element representing the united elements to the sum of the individual coverage areas of the two elements. If the coverage area of the composite element is less than the sum of the coverage areas of the elements individually, then a reduction in total coverage area will result by uniting the elements.

In other exemplary embodiments of the invention, the determination of whether uniting the elements is desirable may be made by reference to the amount of coverage area reduction, giving preference to higher reductions in coverage area, and only when the unifications producing the greatest coverage area reduction are performed, permitting the unifications producing less reduction in coverage area. This prioritization based on amount of coverage area reduction may be performed in exemplary embodiments of the invention using a coverage area reduction factor k, where k represents the coverage area of a composite element combining two elements divided by the sum of the individual coverage areas of the elements. For pairs of elements for which k<1, unifying the elements may decrease area coverage in comparison to leaving the elements separate. Thus, in an exemplary embodiment of the invention, by first uniting pairs of elements having low k, and then the higher values of k elements having greater overlap may be united first, thereby uniting elements to produce a greater reduction of total coverage area first. In exemplary embodiments of the invention, the analysis of whether certain pairs of elements should be united may be based in part on a threshold value of k, which may be incrementally increased from 0.5 to 1, for example, in increments of $\Delta k_1$. Upon determining that all pairs of elements that can be united having k less than 1 have been united, it can be established that no further uniting of elements will result in a further reduction of total coverage area.

For pairs of elements for which k>1, uniting the elements may result in an actual increase of coverage area. As noted above, this may be desirable in order to reduce the number of elements in the document, particularly after all possible pairs of elements have been united that would result in a reduction of coverage area. If this is the case, an exemplary embodiment of the present invention may ensure that a maximum coverage area threshold is not exceeded by uniting the elements by calculating the coverage area of the composite element in addition to the coverage area of the existing elements, and ensuring that the maximum is not exceeded. Tie maximum coverage area may, for example, be calculated, or predetermined manually by the user or automatically by default or other parameters.

It will be recognized that there may be further methods for determining whether efficiency would be increased by uniting elements or whether it would otherwise be desirable to unite elements. In one embodiment of the invention, the intersection matrix may be consulted to determine whether the two elements overlap as an approximation of whether total coverage area would be reduced by uniting the elements. In an exemplary embodiment of the invention, an actual bitmap of a composite element made up of the two elements may be created and its coverage area compared to the sum of the coverage areas of the bitmaps of the original elements.

Figure 4:
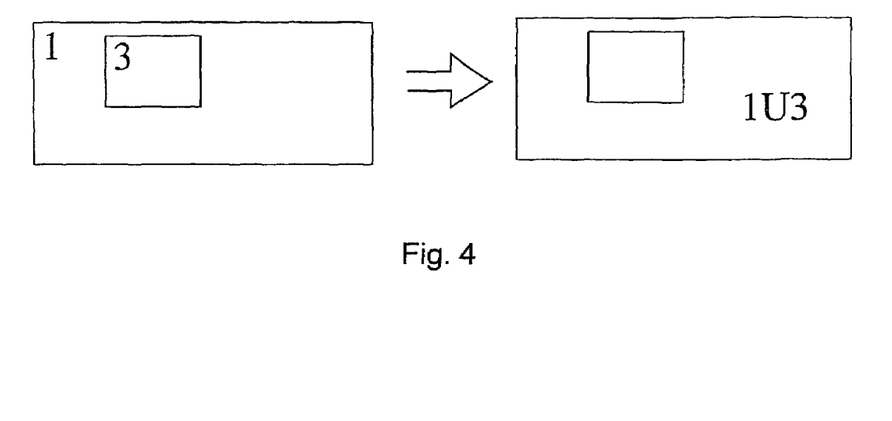
FIG. 4 is a conceptual diagram illustrating two elements of the layout of FIGS. 1A and 1B being united to form a composite element in accordance with embodiments of the present invention.
Figure 5:
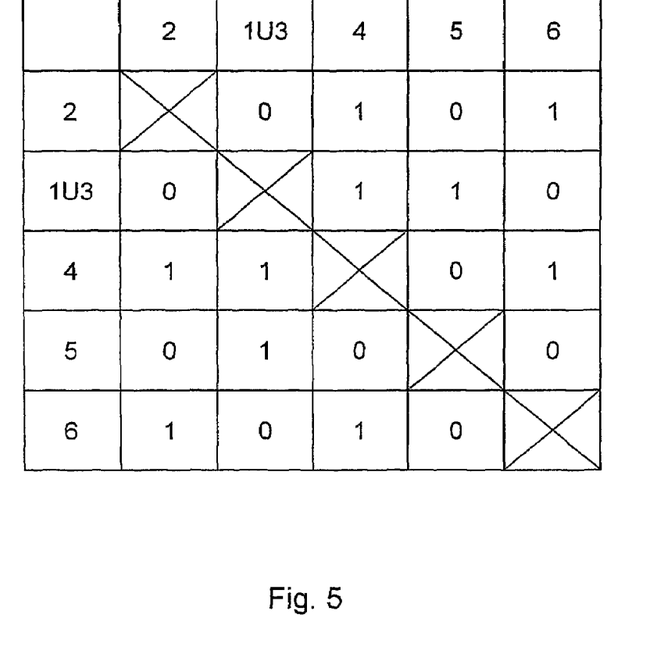
FIG. 5 is a schematic diagram of an intersection matrix, in accordance with embodiments of the present invention.

If it is determined that uniting the elements at hand would be desirable, for example, if total coverage area would be reduced, then as shown at block 316, the two elements are united. That is, as shown in FIG. 4, a new Element 1U3 may be created whose visual appearance may be identical to elements 1 and 3 superimposed, and whose type is the same as the two original elements, which in this example, is fixed. According to exemplary embodiments of the invention, when two elements are united, the intersection matrix may be updated accordingly. For example, according to an exemplary embodiment of the invention, a column and row may be created to replace the two adjacent rows and columns, wherein the intersection information for the new composite element is contained in the new row and column. FIG. 5 is an illustration of an updated intersection matrix When elements 1 and 3 are united, the z-axis order of the elements in the document is 2-1U3-4-5-6, where 1U3 represents the element created to correspond to the combined attributes of Elements 1 and 3. As depicted at block 306, i is then incremented, in this case to 4.

At block 304, Element 4 is determined not to be bottom-most in the z-axis order, because below it in the z-axis order are 2 and 1U3. Next, at block 308, it is asked whether Element 4 may be united with the element directly below it, which in this case, is Element 1U3. The elements cannot be united because Element 4 is unique and Element 1U3 is fixed. At block 310, it is determined whether Element 4 and the element below it, Element 1U3, overlap. In this case, the intersection matrix depicted in FIG. 5 shows that Elements 4 and 1U3 intersect, and therefore, the elements may not be swapped. As shown at block 306, i is then incremented to 5.

Figure 6:
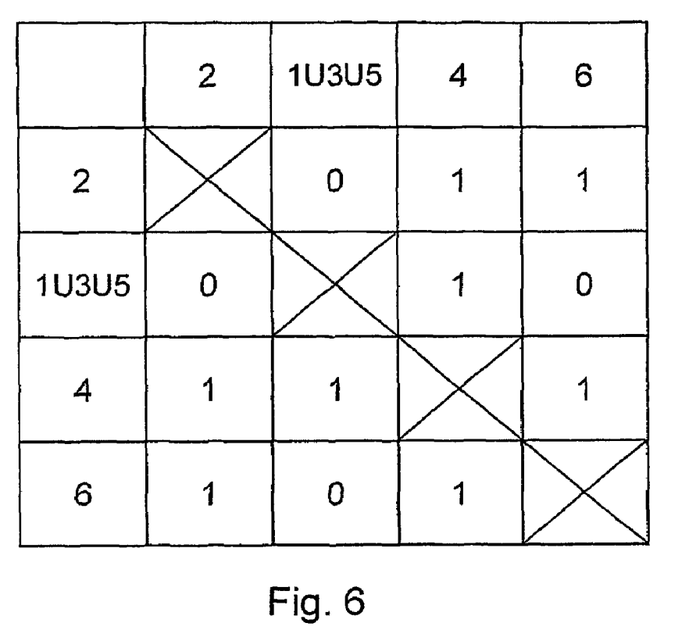
FIG. 6 is a schematic diagram of an intersection matrix, in accordance with embodiments of the present invention.

In the same matter as shown above, it is determined that Element 5 cannot be united with Element 4, but because there is no overlap, the two elements may be swapped, as shown at block 312. Thus, in the example shown for the exemplary embodiment, the rows and columns of Elements 5 and 4 may be swapped. Because Element 5 is still not bottom-most, as depicted at block 304, it is determined at block 308 whether Element 5 may be united with Element 1U3. Because the elements are of the same type, it is determined at block 308 that they may be united. At block 314, it is determined whether the total coverage of the document would be reduced by uniting the elements. In this case, because the proposed element 1U3U5 would have less total coverage area than the sum of the total coverage areas of Elements 1U3 and 5, the creation of the new element 1U3U5 would reduce total coverage area, and the Elements are combined, as shown at block 316. After swapping Elements 4 and 5, and creating new composite Element 1U3U5, the intersection matrix may be as depicted in FIG. 6. The counter i is incremented to 6.

Figure 7:
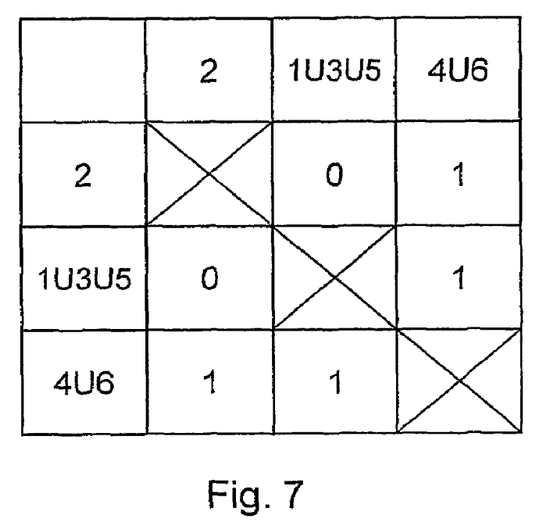
FIG. 7 is a schematic diagram of an intersection matrix, in accordance with embodiments of the present invention.

The method may continue and unite Element 6 with Element 4, as they are of the same type, and uniting the elements would be desirable because total coverage area would be reduced. After uniting Elements 4 and 6, the intersection matrix may look as depicted in FIG. 7.

At this point, the parameter i has reached and exceeded N, and therefore, at block 302 it is determined that the algorithm should proceed with the next stage, as shown in block 318. By now, according to the exemplary embodiment herein described, each element in the document, starting from low-z-axis to high z-axis has been inspected to determine whether it may be united or moved to a lower place in the z-axis order. In the example given, there remain three elements.

Figure 8:
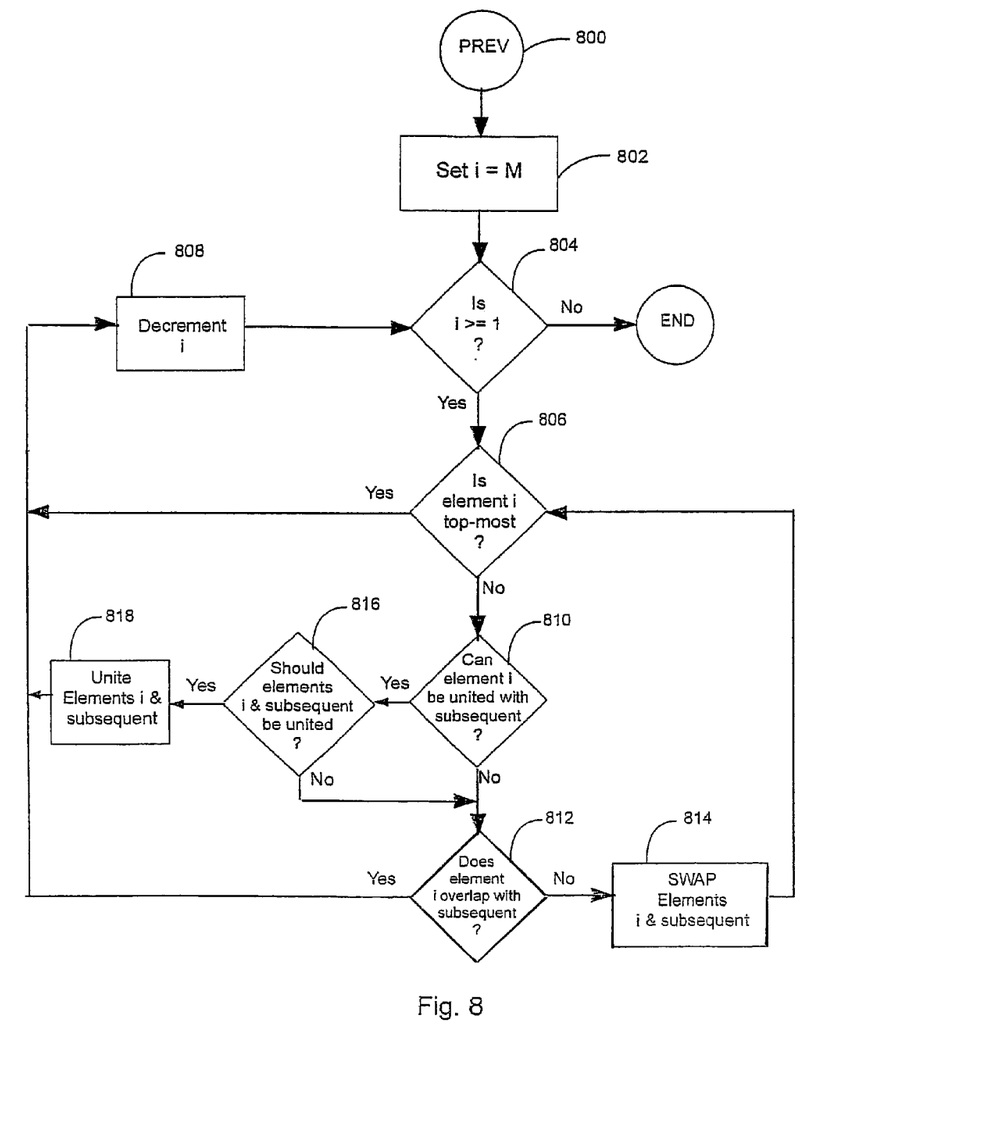
FIG. 8 is a schematic diagram of a flowchart for a method in accordance with embodiments of the present invention.

In an exemplary embodiment of the invention, the modified layout document may inspect each element, starting from high z-axis to low z-axis to determine whether it may be united or moved to a higher place in the z-axis order. FIG. 8 is a schematic illustration of a flowchart for this stage of an algorithm in accordance with an exemplary embodiment of the present invention. Because in the exemplary embodiment of the invention described, the two stages may be similar, this latter stage will be described in less detail. As shown at block 800, this stage may commence after the stage ending in block 318 of FIG. 3. At block 802, the parameter i may be set to M, the highest z-axis of the remaining elements, taking into account the prior combining of elements. In the example provided, M may be 3. As shown at block 806, Element 4U6, the highest element in the z-axis order is determined to be the topmost element in the z-axis order, and at block 808, i is decremented to 2.

As shown at block 810, the next element, Element 1U3U5, cannot be united with the subsequent element, that is, the next-highest element in the z-axis order, namely, Element 4U6, because the elements are of different types. Moreover, as shown at block 812, the elements overlap, and therefore may not be swapped. At block 808, parameter i is further decremented to 1.

The first element in the z-axis order is Element 2. This element may not be united with Element 1U3U5. However, as shown in block 812, because the elements do not overlap, they may be swapped, as shown at block 814. The subsequent, or next-highest, element is not 4U6, which, according to block 810, may be united with Element 2 because they are of identical type. After it is determined at block 816 that the two elements should be united to reduce total coverage area, the elements are united at block 818 to form Element 2U4U6.

In the example provided, the two loops of the method according to embodiments of the present invention, the first loop schematically illustrated in FIG. 3 attempting to push elements down in the z-axis order, and the second loop schematically illustrated in FIG. 8 attempting to pull elements up in the z-axis order, are complete. The final result is two elements instead of the original six, a significant reduction in the number of elements. In addition, the new total area is 21 for 1U3U5, and 64 for 2U4U6, which is a total coverage area of 85, a significant reduction in total coverage area from the original total coverage area of 169 units. It will be recognized that the reduction in total coverage area and/or in total number of elements may depend on the method used in accordance with the present invention, and on the input variable print document presented for processing.

According to some embodiments of the present invention, the method may proceed to determine whether elements may be further united to reduce the total number of elements even at the cost of increasing total coverage area. It will be recognized that a similar procedure to the one above described may be used for this purpose, with several modifications. For below, a pair of elements having low coverage area reduction factor k will be united before a pair of elements having greater k. Moreover, when k is greater than 1, that is, when uniting elements will actually increase the total coverage area, the total area coverage with the pair of elements united is compared against a maximum total coverage area, such that if uniting the elements would cause the document to exceed the maximum total area coverage, the elements are not united.

---

1. Pre-Processing
   1.1. Order elements by z-order
   1.2. Calculate initial intersection matrix
2. Phase I - Minimize Total Coverage Area
   2.1. Start with k = 0.5 and increment by $\Delta k_1$ until k = 1
      2.1.1. For each $ELM_i$ in original list:
         2.1.1.1. While $ELM_i$ is not the bottom-most in z-axis order:
            2.1.1.1.1. If CanUnite $ELM_i$ and $ELM_{prev}$ based on parameter k:
               2.1.1.1.1.1. Unite $ELM_i$, and $ELM_{prev}$
               2.1.1.1.1.2. Break and Go to 2.1.1.1
            2.1.1.1.2. Else If $ELM_i$, intersects with $ELM_{prev}$
               2.1.1.1.2.1. Break and Go to 2.1.1.1
            2.1.1.1.3. Else
               2.1.1.1.3.1. Swap $ELM_i$, and $ELM_{prev}$ in z-axis order
               2.1.1.1.3.2. Continue and Go to 2.1.1.1.1
         2.1.1.2. While $ELM_i$ is not the topmost in the z-axis order:
            2.1.1.2.1. If CanUnite $ELM_i$ and $ELM_{prev}$ based on parameter k:
               2.1.1.2.1.1. Unite $ELM_i$, and $ELM_{subsequent}$
               2.1.1.2.1.2. Break and Go to 2.1.1.1
            2.1.1.2.2. Else If $ELM_i$, intersects with $ELM_{subsequent}$
               2.1.1.2.2.1. Break and Go to 2.1.1.1
            2.1.1.2.3. Else
               2.1.1.2.3.1. Swap $ELM_i$, and $ELM_{subsequent}$ in z-axis order
               2.1.1.2.3.2. Continue and Go to 2.1.1.1.1
3. Phase II - Minimize Number Of Elements
   3.1. Start with k = 1 and increment by $\Delta k_2$ until k = $k_{max}$
      3.1.1. For each $ELM_i$ in original list:
         3.1.1.1. While $ELM_i$ is not the bottom-most in z-axis order:
            3.1.1.1.1. If CanUnite $ELM_i$ and $ELM_{prev}$ based on parameter k AND If Uniting $ELM_i$, and $ELM_{prev}$ would not cause total coverage to reach $A_{max}$ Then:
               3.1.1.1.1.1. Unite $ELM_i$ and $ELM_{prev}$
               3.1.1.1.1.2. Break and Go to 3.1.1.1
            3.1.1.1.2. Else If $ELM_i$, intersects with $ELM_{prev}$
               3.1.1.1.2.1. Break and Go to 3.1.1.1
            3.1.1.1.3. Else
               3.1.1.1.3.1. Swap $ELM_i$, and $ELM_{prev}$ in z-axis order
               3.1.1.1.3.2. Continue and Go to 3.1.1.1.1
         3.1.1.2. While $ELM_i$ is not the topmost in the z-axis order:
            3.1.1.2.1. If CanUnite $ELM_i$ and $ELM_{subsequent}$ based on parameter k AND If Uniting $ELM_i$, and $ELM_{subsequent}$ would not cause total coverage to reach $A_{max}$ Then:
               3.1.1.2.1.1. Unite $ELM_i$, and $ELM_{subsequent}$
               3.1.1.2.1.2. Break and Go to 3.1.1.2
            3.1.1.2.2. Else If $ELM_i$, intersects with $ELM_{subsequent}$
               3.1.1.2.2.1. Break and Go to 3.1.1.1
            3.1.1.2.3. Else
               3.1.1.2.3.1. Swap $ELM_i$, and $ELM_{subsequent}$ in z-axis order
               3.1.1.2.3.2. Continue and Go to 3.1.1.1.1

--- example, block 314 of FIG. 3 and block 816 of FIG. 8 may be modified to unite elements under consideration only when doing so would not increase the total reduction area to a number greater than a threshold maximum total coverage area. In the example provided, no further reduction in the number of elements is possible, and the method ends.

It will be noted that in the above-described embodiment of the invention, the determination of whether it was desirable to unite particular elements was based on whether doing so would reduce total area coverage. It will be noted that numerous criteria for this determination may be used in accordance with embodiments of the present invention. For example, in the below exemplary embodiment of the invention, the determination may be based on the coverage factor k. As shown It will be understood that the above algorithm is but an illustration of a model for one embodiment of the invention, and that the invention is not limited in this respect. In the above embodiment of the invention, the method is divided into Phase I and Phase II, where Phase I occurs for k<1 and Phase II occurs for k>1. In Phase II, elements may be unified for increasing values of k until a $k_{max}$ is reached. $k_{max}$ may be selected to be any number greater than 1. According to an exemplary embodiment of the invention, $k_{max}$ may be 5. A larger $k_{max}$ signifies that the algorithm will continue combining elements even where coverage area is increased. Doing so may have the effect of reducing the number of elements, at the cost of increasing total area coverage. The parameters $\Delta k_1$ and $\Delta k_2$ may be fixed or variable, and may be used to control number of iterations of either the Phase I or Phase II loop. As noted above, because Phase II may increase total coverage area of the document, the method may optionally break out of the loop if the total coverage area of the page exceeds a pre-defined limit $A_{max}$, which may be set, for example, by a user, or by hardware or software considerations. This factor may be chosen arbitrarily, or it may be dictated specific hardware or software limitations or implementations. The total area may have, in some systems, an impact on storage size, bandwidth, number of clock cycles, etc. It may be advisable to accommodate a maximal factor based on a specific configuration.

Figure 9:
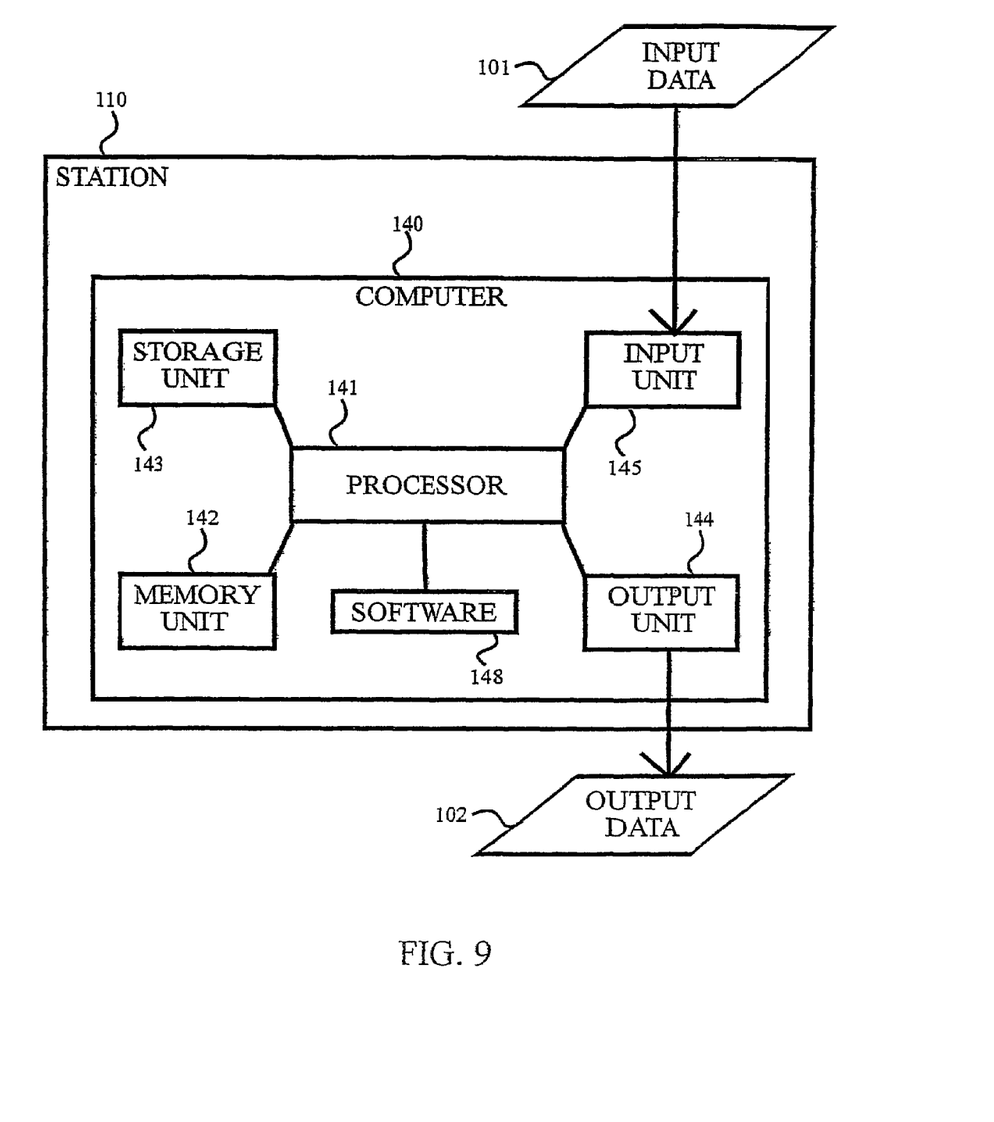
FIG. 9 is a schematic illustration of an apparatus in accordance with some embodiments of the invention.

FIG. 9 schematically illustrates a station 110 in accordance with some embodiments of the invention. Station 110 may be used, for example, to perform analysis in accordance with some embodiments of the invention. Station 110 may be a computing platform or a computing device. For example, station 110 may include a personal computer, a desktop computer, a mobile computer, a laptop computer, a notebook computer, a terminal, a workstation, a server computer, a Personal Digital Assistant (PDA) device, a tablet computer, a network device, a network, or the like. Station 110 may be implemented using any suitable combination of hardware components and/or software components.

In the example shown in FIG. 9, station 110 may include a computer 140, which may include, for example, a processor 141, a memory unit 142, a storage unit 143, an output unit 144, an input unit 145, and a software 148. Station 110 may include other suitable components or sets of components.

Processor 141 may include, for example, a Central Processing Unit (CPU), a Digital Signal Processor (DSP), one or more controllers, or any suitable specific and/or general and/or multi-purpose processor or micro-processor or controller. Memory unit 142 may include, for example, a Random Access Memory (RAM), a Read Only Memory (ROM), a Dynamic RAM (DRAM), or other suitable memory systems. Storage unit 143 may include, for example, a hard disk drive. Output unit 144 may include, for example, a monitor or a printer. Input unit 145 may include, for example, a keyboard, a mouse, a touch-pad, or a scanner. It is noted that processor 141, memory 142, storage unit 143, output unit 144 and/or input unit 145 may include other suitable components and/or implementations as is known in the art.

Software 148 may include, for example, one or more operating systems (e.g., Microsoft Windows, Linux, Unix, Apple OS, Solaris, Sun-OS, HP-UX, or other suitable operating systems), one or more software applications, one or more drivers, and/or various other suitable software components.

In some embodiments, station 110 may receive input data 101 and may produce output data 102. Input data 101 may include, for example, a variable print document in any format currently known or any format known in the future. Input data 101 may be formatted and/or received, for example, in a suitable format. Input data 101 may be entered into station 110 manually, for example, by a designer, and/or automatically, for example, from another program. Input data 101 may include data in other suitable types and/or formats. Any suitable means for receiving the input variable print document may be used in accordance with embodiments of the invention.

It will be understood by those of skill in the art that the method and apparatus of the present invention may be employed by the authoring application before generating the print stream, or, alternately or additionally, it may be employed by the print system to further optimize existing non-optimized print streams. It will be recognized that the embodiment described in the above discussion is not intended to limit the scope of the invention. For example, it will be recognized that the functions performed by the various loops, e.g., starting from low z-order and trying to push elements down or starting from high z-order and trying to pull elements up, from low z-order, may be performed differently by different embodiments of the invention not detailed herein. Likewise, the use of certain parameters, such as k, $\Delta k_1$, $\Delta k_2$, $\Delta k_{max}$, $A_{max}$, and other variables is intended to illustrate an exemplary embodiment of the invention, and is not intended to limit the scope of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of using a processor to create an electronically readable output document based on an electronically readable input document having a visual appearance corresponding to a plurality of elements, each element being characterized at least by a z-axis value and a geometry, wherein said plurality of elements are further characterized by a coverage area and a type, the method comprising:
   for at least two elements in the input document having adjoining z-axis values:
   (a) determining whether creating a composite element in said output document is desirable, by at least:
      determining whether types of said at least two elements are compatible,
      calculating a coverage area of said composite element, and
      comparing said coverage area of said composite element to the sum of said coverage areas of said at least two elements in said input document:
   (b) if creating said composite element is desirable, creating at least one composite element in said output document to represent said at least two elements in said input document;
   (c) if creating said composite element is not desirable, and if said at least two elements do not overlap, altering z-axis values of said at least two elements; and
   producing an output document in which at least one single composite element respectively replaces at least two said elements in the input document.

2. The method of claim 1, wherein said plurality of elements are characterized by a coverage area and wherein said determining if creating said composite element is desirable includes determining whether creating said composite element in said output document results in exceeding a predetermined maximum total coverage area.

3. The method of claim 1, wherein said plurality of elements are characterized by a coverage area and wherein said determining if creating said composite element is desirable includes determining whether a coverage area of said composite element divided by a sum of coverage areas of said at least two elements is less than a predetermined coverage area reduction parameter.

4. The method of claim 1, wherein said type is selected from the set consisting of fixed, reusable and unique.

5. The method of claim 1 wherein said plurality of elements are characterized by coverage areas corresponding to polygons enclosing said elements, respectively.

6. The method of claim 5, wherein said altering z-axis values of said at least two elements if creating said composite element is not desirable and if said at least two elements do not overlap comprises determining whether polygons enclosing said at least two elements overlap.

7. The method of claim 5, wherein said polygons are rectangles.

8. The method of claim 6 wherein said polygons are rectangles.

9. The method of claim 1, wherein said plurality of elements are characterized by coverage areas corresponding to bitmap masks of said elements.

10. The method of claim 9, wherein said altering z-axis values of said at least two elements if creating said composite element is not desirable and if said at least two elements do not overlap comprises determining whether said coverage areas corresponding to bitmap masks of said at least two elements overlap.

11. The method of claim 1, wherein said output variable print document has a format selected from the set consisting of VPS, PPML and ANSI CGATS 2.0 (PPML/VDX).

12. The method of claim 1, wherein said input variable print document has a format selected from the set consisting of VPS, PPML, and ANSI CGATS 2.0 (PPML/VDX).

13. The method of claim 12, wherein said output variable print document has a format selected from the set consisting of VPS; PPML and ANSI CGATS 2.0 (PPML/VDX).

14. Apparatus comprising:
means for receiving an input document having a visual appearance corresponding to a plurality of elements, each element being characterized at least by a geometry and a z-axis value, wherein said plurality of elements are further characterized by a coverage area and a type; and
a processing means for creating an output document by creating at least one composite element in said output document to replace at least two elements having adjoining z-axis values in said input document if creating said composite element is desirable, and otherwise altering z-axis values of said at least two elements if said at least two elements do not overlap, wherein said processing means is further for determining that creating a composite element in said output document is desirable based on compatibility of the types of said at least two elements and based on a comparison of a coverage area of a composite element representing the at least two elements combined to the sum of the coverage areas of the at least two elements.

15. A program storage device having instructions readable by a machine that when executed by the machine results in:
receiving an input document characterized by a visual appearance corresponding to a plurality of elements, each element being characterized at least by a geometry and a z-axis value, wherein said plurality of elements are further characterized by a coverage area and a type; and
creating an output document, wherein creating said output document comprises creating at least one composite element in said output document to replace at least two elements having adjoining z-axis values in said input document if creating said composite element is desirable, and otherwise altering z-axis values of said at least two elements if said at least two elements do not overlap, wherein creation of a composite element in said output document is determined to be desirable based on compatibility of the types of said at least two elements and based on a comparison of a coverage area of a composite element representing the at least two elements combined to the sum of the coverage areas of the at least two elements.

16. The method of claim 1, wherein said input document is a variable print document.

17. The method of claim 1, wherein said output document is a variable print document.

18. The method of claim 1, further comprising repeating steps (a),(b) and (c).

* * * * *